United States Patent
Sekiguchi et al.

(10) Patent No.: US 8,778,440 B2
(45) Date of Patent: Jul. 15, 2014

(54) PLASTIC OIL AND FAT COMPOSITION, AND PRODUCTION METHOD AND USAGE THEREOF

(71) Applicant: J-Oil Mills, Inc., Tokyo (JP)

(72) Inventors: Takehiko Sekiguchi, Tokyo (JP); Tadayoshi Sadakane, Tokyo (JP); Minako Hiraoka, Tokyo (JP); Hiroshi Ito, Tokyo (JP); Aki Teraminami, Tokyo (JP)

(73) Assignee: J-Oil Mills, Inc., Tokyo (JP)

( * ) Notice: Subject to any disclaimer, the term of this patent is extended or adjusted under 35 U.S.C. 154(b) by 0 days.

(21) Appl. No.: 13/803,764

(22) Filed: Mar. 14, 2013

(65) Prior Publication Data

US 2013/0196046 A1   Aug. 1, 2013

Related U.S. Application Data

(63) Continuation of application No. PCT/JP2011/072922, filed on Oct. 5, 2011.

(30) Foreign Application Priority Data

Oct. 19, 2010   (JP) ................................. 2010-234163

(51) Int. Cl.
*A23D 9/00*   (2006.01)

(52) U.S. Cl.
USPC .......................................... 426/606; 426/607

(58) Field of Classification Search
USPC ............................................... 426/606, 607
See application file for complete search history.

(56) References Cited

U.S. PATENT DOCUMENTS

2007/0286940 A1*   12/2007   Herzing et al. ............... 426/607

FOREIGN PATENT DOCUMENTS

| JP | 61179297 A | 8/1986 |
|----|------------|--------|
| JP | 6281497 A | 4/1987 |
| JP | 9224570 A | 9/1997 |
| JP | 2007174988 A | 7/2007 |
| JP | 2007177100 A | 7/2007 |
| JP | 2009291168 A | 12/2009 |
| JP | 201011799 A | 1/2010 |
| JP | 4743924 B1 | 10/2011 |

OTHER PUBLICATIONS

Kellens, M. et al. 2007. European Journal of Lipid Science and Technology 109:336.*
Chong, C. N. 1992. JAOCS 69(2)137.*
Noor Lida, H.M.D. 2002. JAOCS 79(11)1137.*
International Search Report received in PCT/JP2011/072922, dated Oct. 24, 2011.

* cited by examiner

*Primary Examiner* — Carolyn Paden
(74) *Attorney, Agent, or Firm* — Edell, Shapiro & Finnan, LLC

(57) ABSTRACT

A plastic oil and fat composition provides a plastic oil and fat food that has a good filling operability, keeps the feeling of melt-in-the-mouth after long preservation, and is excellent in spreadability, oil-off resistance and the like. In the plastic oil and fat composition, a content of PPP is from 5.5 to 12% by weight, a content of PPLi+PLiP is from 5.5 to 15.5% by weight, a content of PPO+POP is from 7 to 20% by weight, and a value of PPO/(PPO+POP) is from 0.55 to 0.7. A method for producing the plastic oil and fat composition is also provided.

8 Claims, No Drawings

PLASTIC OIL AND FAT COMPOSITION, AND PRODUCTION METHOD AND USAGE THEREOF

CROSS REFERENCE TO RELATED APPLICATIONS

This application is a continuation of PCT/JP2011/072922, filed Oct. 5, 2011, which claims priority from Japanese Patent Application No. 2010-234163, filed Oct. 19, 2010. The entire contents of these applications are hereby incorporated by reference in their entireties.

TECHNICAL FIELD

The present invention relates to a plastic oil and fat composition and a production method and usage thereof, and more specifically, to a plastic oil and fat composition suitable for a base oil and fat to be blended in plastic oil and fat foods such as home-use margarine and fat spread, and a production method and usage thereof.

BACKGROUND

Conventionally, for plastic oil and fat foods such as margarine and shortening, hardened oil and liquid oil, which is in a liquid form at normal temperature, are used in combination. In recent years, it has been reported that trans fatty acids contained in hardened oil cause a rise in LDL and cholesterol quantities, and also increase the risk of carcinogenesis. Thus, plastic oil and fat compositions with reduced or no trans fatty acid are required.

As an oil and fat with reduced or no trans fatty acid, palm oil, extremely hardened oils, liquid oils, and others are generally known. However, when using some of these oils and fats in combination for making a plastic oil and fat food, the resultant food does not become satisfactory in quality because of a shortage in plasticity, the generation of coarse crystals therein, a poor melt-in-the-mouth property, etc.

In order to obtain a plastic oil and fat composition that hardly contains any trans isomer and is good in quality and others, using a natural solid oil and fat and others as raw materials, JP2007-174988A discloses a plastic oil and fat composition made by mixing the followings: 15 to 80% by weight of non-selective interesterified oils containing 15 to 40% by weight of a saturated aliphatic acid having 12 carbon atoms and 30 to 80% by weight of a saturated aliphatic acid having 16 to 18 carbon atoms; and 85 to 20% by weight of an oil and fat in which PPO+POP is from 13 to 55% by weight and PPO/POP>1. In this plastic oil and fat composition, laurin-based oil and fat is used so that the oil and fat may be hydrolyzed to generate soapy smell. Moreover, the composition has a problem against the feeling of melt-in-the-mouth, spreadability, and other qualities, as will be described in Comparative Example 6 in the present specification.

JP2007-177100A discloses a plastic oil and fat composition in which the content of PPP is from 4 to 18% by weight, PPO+POP is from 15 to 55% by weight, PPO/POP>1, and (PPO+POP)/PPP>1.8 in order to obtain a plastic oil and fat food with good operability in production, storability etc., using hardened oil and fractionized oil with reduced trans isomer. In the production of this plastic oil and fat composition, no lauric acid is used. However, the resultant plastic oil and fat food has a problem against the feeling of melt-in-the-mouth, spreadability, and other qualities, as will be described in Comparative Example 5 in the present specification.

JP2009-291168A discloses that the following oil and fat composition is excellent, after long preservation, in plasticity, operability when made into bread or sweets, melt-in-the-mouth property, and flavor: an oil and fat composition for margarine containing two interesterified oils and fats with different iodine values which contain at least one of PPP, PPO and POP in a specific content. However, for this composition, the iodine values must be controlled in predetermined values, and further the production method includes an extremely hardening step so that the operation becomes complicated. Thus, the composition is not very practical. Additionally, the composition has problems about filling operability, hardness and shape-keepability, as will be described in Comparative Example 4 in the present description.

As described above, the plastic oil and fat composition as a base oil and fat (of the food) is unsatisfactory, since plastic oil and fat food made by use of a conventional plastic oil and fat composition is insufficient in filling operability and qualities.

SUMMARY

Thus, an object of the present invention is to provide a plastic oil and fat composition as a base oil and fat allowing to make plastic oil and fat food with a good filling operability, the feeling of melt-in-the-mouth after long preservation, excellent spreadability, oil-off resistance and others and a production method thereof. Another object of the present invention is to provide a production method of a plastic oil and fat food, using the above-described plastic oil and fat composition.

The inventors have made eager investigations about these problems to find out that the following invention can solve the problems. That is, the present invention provides a plastic oil and fat composition in which the content of PPP is from 5.5 to 12% by weight, that of PPLi+PLiP is from 5.5 to 15.5% by weight, that of PPO+POP is from 7 to 20% by weight, and further PPO/(PPO+POP) is from 0.55 to 0.7.

In the present description, PPP denotes triglycerides composed of three palmitic acid; PPLi+PLiP, which may be referred to as $P_2Li$, denotes triglycerides composed of two palmitic acid, and one linoleic acid; and PPO+POP, which may be referred to as $P_2O$, denotes triglycerides composed of two palmitic acid, and one oleic acid.

POP denotes triglycerides in which palmitic acid is present at the 1- and 3-positions and oleic acid is present at the two-position. PPO denotes triglycerides in which palmitic acid is present at the 1- and 2-positions and oleic acid is present at the 3-position, or triglycerides in which oleic acid is present at the 1-position and palmitic aid is present at the 2- and 3-positions. PLiP denotes triglycerides in which palmitic acid is present at 1- and 3-positions and linoleic acid is present at the 2-position. PPLi denotes triglycerides in which palmitic acid is present at the 1- and 2-positions and linoleic acid is present at the 3-position, or triglycerides in which linoleic acid is present at the 1-position and palmitic acid is present at the 2- and 3-positions.

The plastic oil and fat composition preferably comprises:
(1) 10 to 80% by weight of an oil and fat A originating from an interesterified oil made from a palm-based oil and fat having a iodine value of 65 or less and a liquid oil, the content of PPLi+PLiP in the oil and fat A being from 7.5 to 17.5% by weight;
(2) 0 to 50% by weight of an oil and fat B comprising an interesterified oil of a palm-based oil and fat, the content of PPO+POP in the oil and fat B being from 15 to 30% by weight, and PPO/(PPO+POP) being from 0.55 to 0.7; and
(3) 0 to 70% by weight of a liquid oil.

It is particularly preferred that the oil and fat B is contained in a proportion of 20 to 50% by weight of the plastic oil and fat composition.

It is particularly preferred that the liquid oil is contained in a proportion of 20 to 70% by weight of the plastic oil and fat composition.

The plastic oil and fat composition preferably has the solid fat content of 20 to 44% at 5° C., and the solid fat content of 5 to 17% at 25° C.

The above-mentioned crystal content denotes a value obtained by dissolving the plastic oil and fat composition completely, put 2 mL of the oil and fat into a glass vessel, dissolving the oil and fat at 60° C. completely, keeping the oil and fat in a thermostatic water tank at 0° C. for 60 minutes, allowing the oil and fat to stand still in a thermostatic water tank for 30 minutes in which the temperature is adjusted to a measuring temperature, and then measuring the solid fat content by use of an NMR spectrometer (product name: NMS120 minispec, manufactured by BRUKER Corp.).

The present invention also provides a method for producing a plastic oil and fat composition in which the content of PPP is from 5.5 to 12% by weight, that of PPLi+PLiP is from 5.5 to 15.5% by weight, that of PPO+POP is from 7 to 20% by weight, and further PPO/(PPO+POP) is from 0.55 to 0.7, by blending the following:

(1) 10 to 80 parts by weight of an oil and fat A originating from an interesterified oil made from a palm-based oil and fat having a iodine value of 65 or less and a liquid oil, the content of PPLi+PLiP being from 7.5 to 17.5% by weight;

(2) 0 to 50 parts by weight of an oil and fat B comprising an interesterified oil of a palm-based oil and fat, the content of PPO+POP in the oil and fat B being from 15 to 30% by weight, and PPO/(PPO+POP) being from 0.55 to 0.7; and (3) 0 to 70 parts by weight of a liquid oil.

In the above-described production method, it is particularly preferred that the oil and fat B is blended in an amount of 20 to 50 parts by weight.

In the above-described production method, it is particularly preferred that the liquid oil is blended in an amount of 20 to 70 parts by weight.

The present invention also provides a method for producing a plastic oil and fat food, using the above-mentioned plastic oil and fat composition.

The use of the plastic oil and fat composition of the present invention makes it possible to produce a plastic oil and fat food such as spread or margarine, in the state that the composition has good operabilities such as filling operability. The resultant plastic oil and fat food is made from natural edible oil, hardly contains trans fatty acid, and is excellent in spreadability, melt-in-the-mouth property, oil-off resistance and other qualities. Even after long preservation, the food is excellent in plasticity, melt-in-the-mouth property, and spreadability.

The plastic oil and fat composition contains $P_2Li$, of which the melting point is lower than that of PPP and $P_2O$, in a large proportion, whereby the composition is solidified at low temperature but is easily melted near room temperature, so that the network of crystal in the composition comes to be easily broken. Thus, the plastic oil and fat food becomes good in spreadability and melt-in-the-mouth property. However, it is not intended that this reason limits the scope of the present invention.

DETAILED DESCRIPTION OF EMBODIMENTS

Hereinafter, aspects of the present invention will be described in more detail. In the plastic oil and fat composition of the present invention (hereinafter referred to as the composition of the present invention), the PPP content is from 5.5 to 12% by weight, preferably from 6.5 to 9.5% by weight. If the PPP content is less than 5.5% by weight, a plastic oil and fat food produced using the oil and fat composition deteriorates in shape-keepability, melt-in-the-mouth feeling, and oil-off resistance. Conversely, if the content is excessively higher than 12% by weight, the composition remains in the mouth for a long time so that the melt-in-the-mouth feeling becomes poor.

The PPLi+PLiP content in the composition of the present invention is from 5.5 to 15.5% by weight, preferably from 5.5 to 12% by weight. If the PPLi+PLiP content is less than 5.5% by weight, it causes harmful effects such that the composition is not easily spread and is poor in melt-in-the-mouth feeling when it has been made into margarine. When the PPLi+PLiP content is 5.5% or more by weight, the composition can give a good spreadability and melt-in-the-mouth feeling even if the PPP content is high and the solid fat content is high at 5° C. If the PPLi+PLiP content is excessively higher than 15.5% by weight, the problem is caused that the composition is not easily spread or is poor in melt-in-the-mouth feeling.

In the composition of the present invention, the PPO+POP content is from 7 to 20% by weight, preferably from 9 to 19% by weight, more preferably from 9 to 14% by weight. If the PPO+POP content is less than 7% by weight, the plastic oil and fat food deteriorates in shape-keepability and oil-off resistance. Conversely, if the content is more than 20% by weight, the composition, for example in the form of margarine, deteriorates in melt-in-the-mouth property.

In the composition of the present invention, PPO/(PPO+POP) is from 0.55 to 0.7, preferably from 0.6 to 0.7. If this ratio is less than 0.55, the plastic oil and fat food easily changes in hardness with time and it is not suitable for long preservation. Conversely, if the ratio is more than 0.7, the food becomes too hard and the spreadability and melt-in-the-mouth property are damaged.

Constituent fatty acid in the above-described oil and fat may be analyzed in accordance with AOCS Official Method Ce 1h-05 (2005). Triglycerides in the oil and fat may be analyzed in accordance with JAOCS, Vol. 70, No. 11, 1111-1114 (1993).

As a raw material for preparing the composition of the present invention having the above-mentioned properties, an oil and fat may be used which originates from an interesterified oil made from a palm-based oil and fat having a iodine value of 65 or less and a liquid oil, the content of PPLi+PLiP being from 7.5 to 17.5% by weight (hereinafter, the oil and fat will be referred to as the oil and fat A).

The oil and fat A may be obtained from interesterified oil itself obtained by subjecting a mixed oil of a palm-based oil and fat having a iodine value of 65 or less and a liquid oil to nonselective interesterification, fractionalized oil from the interesterified oil and fat, hardened oil of the interesterified oil and fat, hardened oil of the fractionalized oil from the interesterified oil and fat, or any combination of two or more thereof.

Palm-based oil and fat denotes palm oil, palm fractionated oil obtained by fractionating palm oil, or a combination thereof. The fractionated oil is obtained with a known method without any limitation, including a solvent fractionation method in which a solvent such as acetone or hexane is used, or a solvent-free fractionation method such as a drying fractionation method.

The above-mentioned palm-based oil and fat has an iodine value of 65 or less, preferably 55 or less. If a palm-based oil and fat having a iodine value higher than 65 is used, an oil and fat having the desired physical properties is not easily obtained.

The iodine value (IV) may be measured as follows: first, about 0.2 g of the base oil and fat is measured into a mayonnaise bottle, dissolving the base oil and fat into 10 mL of cyclohexane, adding 25 mL of Wyss liquid in it, and storing the resultant in a dark place for 30 minutes. Thereafter, 20 mL of a 10 w/v % solution of potassium iodide and 100 mL of water are added to it. The iodine value of this solution is measured with a potentiometer (product name: 736 GP Titrino, manufactured by Metrohm AG) and a 0.1 mol/L Na thiosulfate standard solution as a titrant.

The liquid oil used for the above-described nonselective interesterification is preferably an animal or plant oil containing 30% or more by weight of linoleic oil such as soybean oil, cotton seed oil, corn oil, rice oil, sunflower oil, and high-linoleate safflower oil. Processed oils and fats, which are obtained by hydrogenating and/or fractionation these oils and fats, may also be used.

In the above-described nonselective interesterification, either alkali catalyst such as sodium hydroxide or sodium methylate, or enzyme catalyst such as lipase is used. Lipase may be fixed onto a carrier such as an ion exchange resin, diatomaceous earth or ceramic material, or may be used in a powdery form.

The PPLi+PLiP content in the oil and fat A is from 7.5 to 17.5% by weight, preferably from 8 to 15% by weight. If the PPLi+PLiP content is less than 7.5% by weight, the plastic oil and fat food may be insufficient in spreadability. Conversely, if the content is more than 17.5% by weight, the oil and fat may be too hard to be easily filled.

The blend proportion of the oil and fat A is from 10 to 80% by weight, preferably from 15 to 50% by weight of the whole of the plastic oil and fat composition.

As a raw material of the plastic oil and fat composition, an oil and fat B may be added to the oil and fat A, which the oil and fat B contains an interesterified oil of a palm-based oil and fat, the content of PPO+POP being from 15 to 30% by weight, and PPO/(PPO+POP) being from 0.55 to 0.7. Using the oils and fats A and B together, the adjustment of the above-mentioned four properties necessary for the composition of the present invention becomes easier.

The oil and fat B may be obtained from interesterified oil itself of a palm-based oil and fat, fractionated oil from the interesterified oil and fat, mixed oil of the interesterified oil and a palm-based oil and fat, mixed oil of the fractionated oil from the interesterified oil and fat and a palm-based oil and fat, interesterified oil of a mixed oil of a palm-based oil and fat and an extremely hardened oil such as high erucic rapeseed extremely hardened oil or rapeseed extremely hardened oil, or fractionated oils from these interesterified oils and fats; or any combination of two or more of these oils.

In the oil and fat B, the content of PPO+POP is from 15 to 30% by weight, preferably from 20 to 30% by weight, more preferably from 20 to 28% by weight. If PPO+POP is less than 15% by weight, the plastic oil and fat food may be insufficient in spreadability. Conversely, if the content is more than 30% by weight, the oil and fat is declined in oil-off resistance etc.

The PPO/(PPO+POP) of the oil and fat B is from 0.55 to 0.7, preferably from 0.6 to 0.7. If PPO/(PPO+POP) is less than 0.55, the plastic oil and fat food easily changes with time during preservation. Conversely, if the ratio is more than 0.7, the oil and fat becomes so hard that it is deteriorated in spreadability and melt-in-the-mouth property.

The blend proportion of the oil and fat B is from 0 to 50% by weight, preferably from 20 to 50% by weight of the whole of the plastic oil and fat composition.

As a raw material of the above-described plastic oil and fat composition, a liquid oil, which is in a liquid form at normal temperature, may be further blended. Blending the liquid oil with the oil and fat A, or a blended oil of the oils and fats A and B, the adjustments of the PPP content, the PPO+POP content, the crystal content at 5° C. and 25° C., and the like become easy.

Examples of the liquid oil include rapeseed oil, rice oil, corn oil, cotton seed oil, safflower oil, sunflower oil, soybean oil, olive oil, sesame oil, fish oil, and the like. These may be used alone, or in combination of two or more thereof. An oil having a melting point of 20° C. or lower is preferred, which particularly includes Corn oil, cotton seed oil and soybean oil.

The blend proportion of the liquid oil is from 0 to 70% by weight, preferably from 20 to 70% by weight of the whole of the plastic oil and fat composition.

Besides the oil and fat A and the optional oil and fat B and liquid oil, additives known in industries in which a plastic oil and fat composition is produced may be appropriately added to the composition of the present invention as far as purposes of the composition of the present invention are not hindered.

The solid fat content in the composition of the present invention at 5° C. is preferably from 20 to 44%, in particular preferably from 26 to 29%. If the solid fat content is less than 20%, the plastic oil and fat food becomes poor in melt-in-the-mouth feeling. Conversely, if the content is higher than 45%, the plastic oil and fat food becomes too hard to be easily spread in the form of margarine or some other. The solid fat content in the plastic oil and fat composition at 25° C. is preferably from 5 to 17%, in particular preferably from 8 to 10%. If the solid fat content at 25° C. is less than 5%, the composition easily undergoes an oil-off phenomenon. Conversely, if the content is higher than 17%, the plastic oil and fat food becomes poor in melt-in-the-mouth property.

The solid fat content is measured by dissolving the oil and fat completely, putting 2 mL of the plastic oil and fat composition at 60° C. into a glass vessel, dissolving the oil and fat at 60° C. completely, keeping the composition in a thermostatic water tank at 0° C. for 60 minutes, then allowing the composition to stand still in a thermostatic water tank in which a temperature is adjusted to a measuring temperature for 30 minutes, and then measuring the solid fat content by use of an NMR spectrometer (product name: NMS120 minispec, manufactured by BRUKER Corp.).

The composition of the present invention hardly contains trans fatty acid. Specifically, the content thereof is usually 5% or less by weight, in particular, 2% or less by weight.

The composition of the present invention may be used as a base oil and fat of plastic oil and fat foods, such as a shortening, a water-in-oil emulsion, and a foam-containing water-in-oil emulsion. The present invention therefore provides a method for producing a plastic oil and fat food using the plastic oil and fat composition.

The shortening may be produced by a method known in the prior art. Specifically, the composition of the present invention and additives described below are mixed while rapidly cooled by means of a cooling mixer such as Kombinator, or a Perfector, or a Votator.

If necessary, an emulsifier may be added to the shortening. The emulsifier is not particularly limited as far as the emulsifier is an emulsifier for food. Examples thereof include lecithin, glycerin fatty acid esters, sorbitan fatty acid esters, propylene glycol fatty acid esters, sucrose fatty acid esters, and polyglycerol fatty acid esters. Among the sorbitan fatty acid esters, esters having a large content of triesters are preferred. These emulsifiers may be used alone or in combination of two or more. The emulsifier(s) is/are added to the shortening usually in a proportion of 3% or less by weight of the shortening.

For the shortening, additives usable widely in the food field may be used besides the emulsifier, examples of the additives including an edible oil and fat, a stabilizer, a food coloring, and a flavor.

Thus, the obtained shortening is useful as a shortening for confectionery or for bakers, or a filling for confectionery or bakers.

The water-in-oil emulsion is obtained by stirring/emulsifying an oil phase part containing the composition of the present invention, together with a water phase part containing additives described below and pre-emulsified by heating and kneading, by means of a cooling mixer such as a Kombinator, a Perfector or a Votator, thereby preparing an emulsion; and then stabilizing the emulsion at a low temperature. The ratio by weight of the oil phase part to the water phase part is usually from 30/70 to 95/5, preferably from 40/60 to 90/10. The emulsion is made into an appropriate form, such as a block or a sheet.

One or more of the examples of the emulsifier that have been described for the shortening may be appropriately incorporated into the oil phase part or water phase part. The emulsifier used in particular in the oil phase part is preferably lecithin, a sorbitan fatty acid ester or a glycerin fatty acid ester, and the emulsifier used in the water phase part is preferably a sucrose fatty acid ester. The emulsifier is used in the water-in-oil emulsion usually in a proportion of 3% or less by weight.

Examples of other additives incorporated into the water-in-oil emulsion include edible oils and fats other than the composition of the present invention; antioxidants such as tocopherol, and palmitate vitamin C; thickeners/stabilizers such as pectin, carrageenan, xanthan gum, carboxymethyl cellulose (CMC), guar gum, gum arabic, locust beam gum, karaya gum, tamarind gum, tara gum, furcellaran, sodium caseinate, alginates, agar, gum elemi, gum Canada, and gum dammar; food colorings; flavors such as milk flavor, vanilla flavor, and vanilla essence; sugars such as glucose, maltose, sucrose, lactose, trehalose, maltotriose, palatinose, reduced palatinose, xylitol, erythritol, maltitol, sorbitol, isomerized liquid sugar, and starch syrup; salt; and dairy products such as whole milk powder, butter milk, fermented milk, powdered skim nonfat milk, full-fat sweetened condensed milk, nonfat sweetened condensed milk, and raw cream.

The thus obtained water-in-oil emulsion is used as home-use margarine, home-use fat spread, margarine for bakers, margarine for confectionery, butter cream, dip cream, sugar cream, and the like.

The foam-containing water-in-oil emulsion is obtained by kneading a pre-emulsified emulsion of an oil-phase mixture containing the oil and fat composition of the present invention and a water-phase mixture while cooling the emulsion and simultaneously blowing a gas such as nitrogen or air thereinto. The resultant foam-containing water-in-oil emulsion has a specific gravity of 0.3 to 0.7. Additionally, the emulsion is good in melt-in-the-mouth feeling, and also excellent in oil-off resistance at room temperature.

The foam-containing water-in-oil emulsion is useful as home-use soft margarine, home-use fat spread, butter cream, dip cream, and the like.

EXAMPLES

Hereinafter, the present invention will be described by way of examples and comparative examples. However, the present invention is not limited to these examples and comparative examples.

Examples 1 to 15, and Comparative Examples 1 to 7

1. Plastic Oil and Fat Compositions
1.1 Preparation of Base Oils

Oils and fats A and B usable as raw materials of compositions of the present invention and interesterified oils and the like used in the comparative examples were prepared through processes described below. The term "part(s)" denotes a part or parts by weight.

Example 1

Oil and Fat 75 parts of a palm stearin of IV=32 (product name: PALM STEARIN, available from Mitsui & Co., Ltd.); 10 parts of a palm oil of IV=51 (manufactured by J-OIL MILLS, Inc.); and 15 parts of a corn oil (product name: CORN OIL, manufactured by J-OIL MILLS, Inc.) were blended and added to an oil and fat in a proportion of 0.3% to conduct a nonselective interesterification, using sodium methylate as a catalyst, at 80° C. under a vacuum degree of 20 Torr for 60 minutes. Thereafter, the resultant was washed with water, dehydrated, bleached, and deodorized to obtain an oil and fat 1 corresponding to the oil and fat A. Physical properties of the oil and fat 1 (PPP content (%), P2Li content (%), PPO+POP content, PPO/(PPO+POP), and trans fatty acids content (%)) are shown in Table 1.

Example 2

Oil and Fat 2

The same operation was made except that the corn oil for the oil and fat 1 was substituted with soybean oil (product name: DAIZU SHIRA SHIME YU, manufactured by J-OIL MILLS, Inc.) to obtain an oil and fat 2 corresponding to the oil and fat A. Physical properties thereof are shown in Table 1.

Example 3

Oil and Fat 3

A palm olein of IV=56 (manufactured by J-OIL MILLS, Inc.) was added to an oil and fat in a proportion of 0.3% to conduct a nonselective interesterification, using sodium methylate as a catalyst, at 80° C. under a vacuum degree of 20 Torr for 60 minutes. Thereafter, the resultant was washed with water, dehydrated, bleached, and deodorized to obtain an oil and fat 3 corresponding to the oil and fat B. Physical properties thereof are shown in Table 1.

Example 4

Oil and Fat 70 parts of the above-mentioned palm stearin (IV=32) and 30 parts of a high-linoleate safflower oil (manufactured by J-OIL MILLS, Inc.) were blended and added to an oil and fat in a proportion of 0.3% to conduct a nonselective interesterification, using sodium methylate as a catalyst, at 80° C. under a vacuum degree of 20 Torr for 60 minutes. Thereafter, the resultant was washed with water, dehydrated, bleached, and deodorized to obtain an oil and fat 4 corresponding to the oil and fat A. Physical properties thereof are shown in Table 1.

Example 5

Oil and Fat 70 parts of the above-mentioned palm stearin (IV=32) and 30 parts of a rapeseed oil (product name: NATANE SHIRA SHIME YU, manufactured by J-OIL MILLS, Inc.) were blended and added to an oil and fat in a proportion of 0.3% to conduct a nonselective interesterification, using sodium methylate as a catalyst, at 80° C. under a vacuum degree of 20 Torr for 60 minutes. Thereafter, the resultant was washed with water, dehydrated, bleached, and deodorized to obtain an oil and fat 5 corresponding to the oil and fat A. Physical properties thereof are shown in Table 1.

Example 6

Oil and Fat 80 parts of the oil and fat 3 and 20 parts of the above-mentioned palm olein oil (IV=56) were blended to obtain an oil and fat 6 corresponding to the oil and fat B. Physical properties thereof are shown in Table 1.

Example 7

Oil and Fat 50 parts of the above-mentioned palm stearin (IV=32) and 50 parts of the above-mentioned rapeseed oil were blended and added to an oil and fat in a proportion of 0.3% to conduct a nonselective interesterification, using sodium methylate as a catalyst, at 80° C. under a vacuum degree of 20 Torr for 60 minutes. Thereafter, the resultant was washed with water, dehydrated, bleached, and deodorized to obtain an oil and fat 7. Physical properties thereof are shown in Table 1.

Example 8

Oil and Fat 50 parts of the above-mentioned palm stearin (IV=32) and 50 parts of a palm kernel olein of IV=24 (manufactured by J-OIL MILLS, Inc.) were blended, and the resultant mixed oil and fat was hydrogenated, and then added to an oil and fat in a proportion of 0.3% to conduct a nonselective interesterification, using sodium methylate as a catalyst, at 80° C. under a vacuum degree of 20 Ton for 60 minutes. Thereafter, the resultant was washed with water, bleached, discolored, and deodorized to obtain an oil and fat 8. The resultant oil and fat had a iodine value of 1.0. Physical properties thereof are shown in Table 1.

Example 9

Oil and Fat 66 parts of the above-mentioned palm stearin (IV=32), 31 parts of the above-mentioned palm oil (IV=51), and 3 parts of high erucic rapeseed extremely hardened oil (product name: HIGH ERUCIC RAPESEED EXTREMELY HARDENED OIL, manufactured by Yokozeki Oil & Oil and fat Industries Co., Ltd.) were blended and added to an oil and fat in a proportion of 0.3% to conduct a nonselective interesterification, using sodium methylate as a catalyst, at 80° C. under a vacuum degree of 20 Torr for 60 minutes. Thereafter, the resultant was washed with water, dehydrated, bleached, and deodorized to obtain an oil and fat 9 corresponding to the oil and fat B. Physical properties thereof are shown in Table 1.

Example 10

Oil and Fat 65 parts of a palm kernel oil of IV=14 (manufactured by J-OIL MILLS, Inc.) and 35 parts of a palm double olein of IV=67 (manufactured by J-OIL MILLS, Inc.) were blended and added to an oil and fat in a proportion of 0.3% to conduct a nonselective interesterification, using sodium methylate as a catalyst, at 80° C. under a vacuum degree of 20 Torr for 60 minutes. Thereafter, the resultant was washed with water, dehydrated, bleached, and deodorized to obtain an oil and fat 10. Physical properties thereof are shown in Table 1.

Example 11

Oil and Fat

The above-mentioned palm double olein (IV=67) was added to an oil and fat in a proportion of 0.3% to conduct a nonselective interesterification, using sodium methylate as a catalyst, at 80° C. under a vacuum degree of 20 Torr for 60 minutes. Thereafter, the resultant was washed with water, dehydrated, bleached, and deodorized to obtain an oil and fat 11 corresponding to the oil and fat B. Physical properties thereof are shown in Table 1.

Example 12

Oil and Fat

The above-mentioned palm olein (IV=56) was used as an oil and fat 12. Physical properties thereof are shown in Table 1.

TABLE 1

| | type | PPP (% by weight) | PPLi + PLiP (% by weight) | PPO + POP (% by weight) | PPO/ (PPO + POP) | Trans fatty acid (% by weight) |
|---|---|---|---|---|---|---|
| Oil and fat 1 | Oil and fat A | 20.4 | 12.8 | 25.4 | 0.62 | 0.0 |
| Oil and fat 2 | Oil and fat A | 19.7 | 12.9 | 25.1 | 0.62 | 0.0 |
| Oil and fat 3 | Oil and fat B | 12.0 | 7.4 | 23.7 | 0.62 | 0.0 |
| Oil and fat 4 | Oil and fat A | 13.9 | 17.3 | 15.8 | 0.62 | 0.0 |
| Oil and fat 5 | Oil and fat A | 12.1 | 7.6 | 24.3 | 0.62 | 0.4 |
| Oil and fat 6 | Oil and fat B | 8.8 | 7.3 | 27.2 | 0.56 | 0.0 |
| Oil and fat 7 | | 5.8 | 4.4 | 14.6 | 0.62 | 0.8 |

TABLE 1-continued

| | type | PPP (% by weight) | PPLi + PLiP (% by weight) | PPO + POP (% by weight) | PPO/ (PPO + POP) | Trans fatty acid (% by weight) |
|---|---|---|---|---|---|---|
| Oil and fat 8 | | 3.7 | 0.0 | 0.0 | — | 0.0 |
| Oil and fat 9 | Oil and fat B | 20.1 | 6.1 | 29.2 | 0.62 | 0.0 |
| Oil and fat 10 | | 0.9 | 0.0 | 2.1 | 0.62 | 0.0 |
| Oil and fat 11 | Oil and fat B | 5.0 | 5.4 | 16.3 | 0.62 | 1.0 |
| Oil and fat 12 | | 1.3 | 6.2 | 35.0 | 0.20 | 0.0 |
| Soy bean oil | Liquid oil | 0.0 | 3.9 | 1.3 | 0.20 | 1.1 |
| Rapeseed oil | Liquid oil | 0.0 | 0.0 | 0.0 | — | 1.5 |
| Corn oil | Liquid oil | 0.0 | 1.5 | 0.0 | — | 0.3 |

1.2 Preparation of Plastic Oil and Fat Compositions

Some of the raw materials in Table 1 were blended in accordance with a composition-ratio shown in Table 2 to prepare plastic oil and fat compositions of the examples and the comparative examples. Comparative Examples 4, 5 and 6 correspond to plastic oil and fat compositions described in Patent Literatures 3, 2 and 1, respectively. Physical properties of the resultant compositions are shown in Table 2.

TABLE 2

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Oil and fat composition | Oil and fat 1 | 15 | 15 | 15 | 15 | | | | 25 | 25 | | |
| | Oil and fat 2 | | | | | 15 | | | | | | |
| | Oil and fat 3 | 30 | 30 | 30 | 30 | 30 | 40 | | 5 | 40 | | 30 |
| | Oil and fat 4 | | | | | | 30 | 50 | | | 75 | |
| | Oil and fat 5 | | | | | | | | | | | 15 |
| | Oil and fat 6 | | | | | | | | | | | |
| | Oil and fat 7 | | | | | | | | | | | |
| | Oil and fat 8 | | | | | | | | | | | |
| | Oil and fat 9 | | | | | | | | | | | |
| | Oil and fat 10 | | | | | | | | | | | |
| | Oil and fat 11 | | | | | | | | | | | |
| | Oil and fat 12 | | | | | | | | | | | |
| Liquid oil | Soy bean | 55 | | | 30 | 55 | 30 | 50 | 70 | 35 | 25 | 55 |
| | Rapeseed | | 55 | | 25 | | | | | | | |
| | Corn | | | 55 | | | | | | | | |
| Plastic oil and fat composition | PPP (% by weight) | 7.1 | 7.1 | 7.1 | 7.0 | 7.0 | 9.0 | 8.0 | 5.7 | 9.3 | 11.5 | 5.6 |
| | PPLi + PLiP (% by weight) | 6.6 | 5.6 | 5.8 | 6.2 | 6.5 | 10.1 | 11.8 | 6.8 | 7.5 | 15.2 | 5.6 |
| | PPO + POP (% by weight) | 12.9 | 11.9 | 10.9 | 11.3 | 12.7 | 14.3 | 10.1 | 7.1 | 18.7 | 12.8 | 12.5 |
| | PPO/ (PPO + POP) | 0.62 | 0.62 | 0.62 | 0.62 | 0.62 | 0.62 | 0.62 | 0.62 | 0.62 | 0.62 | 0.62 |
| Crystal content (%) | 5° C. | 26.9 | 26.9 | 26.4 | 27.5 | 27.5 | 41.7 | 28.8 | 20.6 | 34.5 | 43.1 | 22.6 |
| | 25° C. | 8.1 | 8.0 | 8.1 | 8.1 | 8.1 | 13.9 | 9.3 | 6.5 | 14.0 | 16.4 | 6.2 |
| T | | 0.5 | 0.8 | 0 | 0.7 | 0.6 | 0.3 | 0.5 | 0.7 | 0.4 | 0.3 | 0.7 |

| | | Example | | | | Comparative Example | | | | | | |
|---|---|---|---|---|---|---|---|---|---|---|---|---|
| | | 12 | 13 | 14 | 15 | 1 | 2 | 3 | 4 | 5 | 6 | 7 |
| Oil and fat composition | Oil and fat 1 | 15 | 25 | 40 | 10 | 5 | 35 | | | | | 15 |
| | Oil and fat 2 | | | | | | | | | | | |
| | Oil and fat 3 | | 50 | 20 | 30 | 10 | 55 | 30 | 40 | | | 15 |
| | Oil and fat 4 | | | | | | | | | | | |
| | Oil and fat 5 | | | | | | | | | | | |
| | Oil and fat 6 | 30 | | | | | | | | | | |
| | Oil and fat 7 | | | | | | | | 15 | | | |
| | Oil and fat 8 | | | | | | | 15 | | | | |
| | Oil and fat 9 | | | | | | | | | 10 | | |
| | Oil and fat 10 | | | | | | | | | | 15 | |
| | Oil and fat 11 | | | | | | | | | 30 | 55 | |
| | Oil and fat 12 | | | | | | | | | | | 15 |
| Liquid oil | Soy bean | 55 | 25 | 40 | 60 | 85 | 10 | 55 | | 60 | 33 | 55 |
| | Rapeseed | | | | | | | | 45 | | | |
| | Corn | | | | | | | | | | | |
| Plastic oil and fat composition | PPP (% by weight) | 5.6 | 9.9 | 10.8 | 5.5 | 2.6 | 13.0 | 3.8 | 3.9 | 4.6 | 3.2 | 5.7 |
| | PPLi + PLiP (% by weight) | 6.1 | 7.9 | 8.4 | 5.5 | 4.7 | 8.8 | 4.9 | 4.6 | 5.0 | 5.0 | 6.5 |

TABLE 2-continued

|  |  |  |  |  |  |  |  |  |  |  |  |
|---|---|---|---|---|---|---|---|---|---|---|---|
| | PPO + POP (% by weight) | 12.7 | 19.8 | 17.1 | 11.7 | 6.3 | 23.8 | 10.4 | 12.3 | 10.6 | 11.4 | 14.1 |
| | PPO/ (PPO + POP) | 0.57 | 0.62 | 0.62 | 0.62 | 0.62 | 0.62 | 0.62 | 0.62 | 0.62 | 0.62 | 0.45 |
| Crystal content (%) | 5° C. | 23.0 | 42.7 | 41.1 | 22.4 | 7.9 | 56.7 | 21.9 | 39.3 | 19.1 | 27.9 | 21.5 |
| | 25° C. | 5.4 | 13.2 | 15.6 | 6.5 | 2.0 | 22.0 | 5.1 | 15.7 | 4.8 | 4.4 | 6.5 |
| T | | 0.6 | 0.3 | 0.4 | 0.5 | 0.9 | 0.1 | 0.7 | 0.6 | 1 | 0.9 | 0.6 |

*T: trans fatty acids (% by weight)

2. Plastic Oil and Fat Foods

The plastic oil and fat compositions prepared as described above were used to produce margarine as a plastic oil and fat food through a following process. An oil phase part and a water phase part shown in Table 3 were each prepared. The water phase was poured into the oil phase part kept at about 60° C. while the oil phase was stirred. In this way, pre-emulsification was conducted. The pre-emulsification was continued for about 20 minutes. After the pre-emulsification, the emulsion was supplied to a desktop Votator, and passed through a cooling cylinder and a pin machine twice in this order to knead the emulsion while cooled rapidly. In this way, the margarine was prepared.

TABLE 3

| | Composition | Ratio (parts by weight) |
|---|---|---|
| Oil phase | plastic oil and fat composition | 81.82 |
| | lecithin | 0.12 |
| | stearate-type monoglyceride | 0.06 |
| Water phase | water | 16.1 |
| | refined salt | 1.4 |
| | powdered skim nonfat milk | 0.5 |
| | total | 100 |

Table 4 shows the filling operability of the margarines during the production, a change in the hardness with time, the spreadability, the evaluation of the melt-in-the-mouth feel, and that of the oil-off resistance. The following will describe methods for evaluating the filling operability during the production, the change in the hardness when the margarine was stored, the shape-keepability, the melt-in-the-mouth feel, the spreadability and the oil-off resistance.

Evaluation of the Filling Operability:

After 3 minutes from the filling of the margarine, the hardness thereof was measured with a viscoelasticity meter (product name: FUDO RHEOMETER, manufactured by Fudo Kogyo K.K.; probe diameter: 1.5 cm, and rate: 6 cm/minute). A criterion for determining and evaluating the operability is as follows:

⊚: an appropriate hardness, very good (3 g or more, and less than 15 g).

○: good (15 g or more, and less than 25 g).

x: soft or too hard, poor (less than 3 g, and 25 g or more).

Hardness Evaluation:

The margarine was stored at 5° C., and, after two weeks and after one month from the start of the storage, the hardness at 5° C. was measured with a cone penetrometer to be evaluated.

Measuring device: cone penetrometer (manufactured by Kuramochi Science Instruments Works Co., Ltd.)

Apical angle: 40°

A criterion for determining and evaluating this property is as follows:

⊚: very good (300 g/cm² or more, and less than 800 g/cm²)

○: good (800 g/cm² or more, and less than 1200 g/cm²)

x: poor (less than 300 g/cm², and 1200 g/cm² or more)

Shape-Keepability Evaluation:

The margarine was stored at 5° C. for 2 weeks, and then stored at 25° C. for 5 hours. The hardness was then measured with the cone penetrometer to evaluate the shape-keepability. A criterion for determining and evaluating this property is as follows:

⊚: very good (15 g/cm² or more)

○: good (5 g/cm² or more, and less than 15 g/cm²)

x: poor (less than 5 g/cm²)

Melt-in-the-Mouth Feeling Evaluation:

When the produced margarine was put into the mouth, it was evaluated whether or not the melt-in-the-mouth feeling was good. A criterion for determining and evaluating this property is as follows:

⊚: very good in melt-in-the-mouth feeling

○: good in melt-in-the-mouth feeling x: poor in melt-in-the-mouth feeling; the margarine remains in the mouth, or from a moment when the margarine was put into the mouth, the margarine gave a pasty or viscous feeling of the liquid oil.

Evaluation of Spreadability:

The spreadability of the margarine was evaluated after two weeks and after one month from the start of the storage at 5° C. on the basis of the spreadability felt when about 20 g of the margarine was taken with a butter knife and spread onto a paper towel. A criterion for determining and evaluating this property is as follows:

⊚: very good in spreadability

○: good in spreadability x: poor in spreadability

Evaluation of Oil-Off Resistance:

The margarine was stored at 5° C. for 2 weeks, and then allowed to stand still at 25° C. for 5 hours. Thereafter, the exudation of the liquid oil therefrom was evaluated. A criterion for determining and evaluating this property is as follows:

⊚: no exudation thereof was observed, and the oil-off resistance was good.

○: the liquid oil slightly exuded.

x: the liquid oil exuded in a large amount, and the oil-off resistance was bad.

TABLE 4

| | Example | | | | | | | | | | | | | | | Comparative example | | | | | | |
|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 1 | 2 | 3 | 4 | 5 | 6 | 7 |
| Operability | ◎ | ◎ | ◎ | ◎ | ◎ | ◎ | ◎ | ○ | ◎ | ◎ | ◎ | ◎ | ○ | ○ | ◎ | X | X | ○ | X | ○ | X | ◎ |
| Hardness (2 weeks) | ◎ | ◎ | ◎ | ◎ | ◎ | ◎ | ◎ | ○ | ◎ | ◎ | ◎ | ◎ | ○ | ○ | ○ | X | ◎ | X | ○ | X | X | ◎ |
| Hardness (1 week) | ◎ | ◎ | ◎ | ◎ | ◎ | ○ | ◎ | ○ | ○ | ○ | ○ | ○ | ○ | ○ | ○ | X | ○ | ◎ | ○ | ○ | ◎ | X |
| Shape-keepability | ◎ | ◎ | ◎ | ◎ | ◎ | ◎ | ◎ | ○ | ◎ | ◎ | ○ | ○ | ◎ | ◎ | ○ | X | X | X | ◎ | X | X | X |
| Spreadability | ◎ | ◎ | ◎ | ◎ | ◎ | ◎ | ◎ | ○ | ◎ | ○ | ○ | ○ | ○ | ○ | ◎ | X | ◎ | X | X | ○ | ○ | ○ |
| Melt-in-the-mouth | ◎ | ◎ | ◎ | ◎ | ◎ | ◎ | ◎ | ◎ | ◎ | ○ | ◎ | ◎ | ○ | ○ | ◎ | X | X | X | ○ | X | X | ○ |
| Oil-off resistance | ◎ | ◎ | ◎ | ◎ | ◎ | ◎ | ◎ | ○ | ◎ | ◎ | ○ | ○ | ◎ | ◎ | ◎ | X | ◎ | X | ○ | X | X | ○ |

As shown by results in Table 4, the comparative examples which contains the conventional plastic oil and fat food had several defects, when the oils and fats were processed into the margarine, about the filling operability the hardness change with time, the shape-keepability when the margarine was allowed to stand still at room temperature, the spreadability, the melt-in-the-mouth feeling and the oil-off resistance. By contrast, in the case of using the plastic oil and fat foods containing the plastic oil and fat composition according to the present invention, the plastic oil and fat foods hardly contained trans fatty acids and were good in quality about all the items. The plastic oil and fat composition according to the present invention can be expected to be good in quality when used for confectionery, margarine for bakers, shortenings, filling for confectionery, home margarine, home fat spreads, and the like.

From comparison between the examples and the comparative examples, physical properties of the compositions of the present invention are concluded as follows: Comparative Examples 1, 3, 4, 5 and 6, in which the PPP content was 4.6% or less by weight, were poor in shape-keepability, melt-in-the-mouth feeling, and oil-off resistance. If the content was conversely too high as in Comparative Example 2, the margarine remained over a long time and was poor in melt-in-the-mouth feeling. From these results, it was found that the PPP content in the plastic oil and fat composition is essentially from 5.5 to 12% by weight, preferably from 6.5 to 9.5% by weight.

Comparative Examples 1, 3, 4, 5 and 6, wherein the PPLi+PLiP content was 5.5% or less by weight, were too soft to be easily spread. By contrast, when the PPLi+PLiP content was high as in Examples 6, 7 and 10, the margarines exhibited good spreadability and melt-in-the-mouth feeling even when high in PPP content and the solid fat content at 5° C. If the PPLi+PLiP content was excessively higher than 15.5% by weight, the margarines were deteriorated in spreadability and melt-in-the-mouth feeling. From these results, it was found that the PPLi+PLiP content is essentially from 5.5 to 15.5% by weight, preferably from 5.5 to 12% by weight.

If the PPO+POP content was less than 7% by weight as in Comparative Example 1, the margarine was very poor in shape-keepability and oil-off resistance. If the content was conversely 20% or more by weight as in Comparative Example 2, the margarine was poor in melt-in-the-mouth feeling. From these results, it was found that the PPO+POP content is essentially from 7 to 20% by weight, preferably from 9.0 to 15.0% by weight.

If PPO/(PPO+POP) was less than 0.55 as in Comparative Example 7, the margarine changed easily in hardness with time to be unsuitable for being long preservation. If the ratio was conversely higher than 0.7, the margarine became so hard that it was damaged in spreadability and melt-in-the-mouth feeling. From these results, it was found that PPO/(PPO+POP) is essentially from 0.55 to 0.7, preferably from 0.6 to 0.7.

If the solid fat content at 5° C. was 8% or less as in Comparative Example 1, the margarine was so soft that it was poor in filling operability and that, to begin with, it was difficult to produce the margarine. If the solid fat content was conversely 56% or more as in Comparative Example 2, the margarine was so hard that it was bad in filling operability and melt-in-the-mouth feeling. When the crystal content was in the range specified in the examples, the margarines were good in filling operability. From these results, it was found that the crystal content at 5° C. is essentially from 20 to 44%, preferably from 26 to 29%.

If the crystal content at 25° C. was less than 5% as in Comparative Examples 1, 5 and 6, the margarines were poor in shape-keepability, spreadability, melt-in-the-mouth feeling, and oil-off resistance. If the crystal content was conversely 22% or more as in Comparative Example 2, the margarine was bad in melt-in-the-mouth feeling. When the crystal content was in the range specified in the examples, the margarines were good in shape-keepability, spreadability, melt-in-the-mouth feeling, and oil-off resistance. From these results, it was found that the crystal content at 25° C. is essentially from 5 to 17%, preferably from 8 to 10%.

The invention claimed is:

1. A plastic oil and fat composition, wherein a content of PPP is from 5.5% to 12% by weight, a content of PPLi+PLiP is from 5.5% to 15.5% by weight, a content of PPO+POP is from 7% to 20% by weight, and a value of PPO/(PPO+POP) is from 0.55 to 0.7.

2. The plastic oil and fat composition according to claim 1, further comprising:
   (1) 10% to 80% by weight of an oil and fat A originating from an interesterified oil made from a palm-based oil and fat having a iodine value of 65 or less and a liquid oil, a content of PPLi+PLiP in the oil and fat A being from 7.5% to 17.5% by weight;
   (2) 0% to 50% by weight of an oil and fat B comprising an interesterified oil of a palm-based oil and fat, a content of PPO+POP in the oil and fat B being from 15% to 30% by weight, and a value of PPO/(PPO+POP) being from 0.55 to 0.7; and
   (3) 0% to 70% by weight of a liquid oil.

3. The plastic oil and fat composition according to claim 2, further comprising 20% to 50% by weight of the oil and fat B.

4. The plastic oil and fat composition according to claim 2, further comprising 20% to 70% by weight of the liquid oil.

5. The plastic oil and fat composition according to claim 1, wherein a crystal content at 5° C. is 20% to 44%, and a crystal content at 25° C. is 5% to 17%.

6. A method for producing a plastic oil and fat composition in which a content of PPP is from 5.5% to 12% by weight, a content of PPLi+PLiP is from 5.5% to 15.5% by weight, a content of PPO+POP is from 7% to 20% by weight, and a value of PPO/(PPO+POP) is from 0.55 to 0.7, the method comprising blending the following:
   (1) 10 to 80 parts by weight of an oil and fat A originating from an interesterified oil made from a palm-based oil and fat having a iodine value of 65 or less and a liquid oil, a content of PPLi+PLiP in the oil and fat A being from 7.5% to 17.5% by weight;
   (2) 0 to 50 parts by weight of an oil and fat B comprising an interesterified oil of a palm-based oil and fat, a content of PPO+POP in the oil and fat B being from 15% to 30% by weight, and PPO/(PPO+POP) being from 0.55 to 0.7; and
   (3) 0 to 70 parts by weight of a liquid oil.

7. The method for producing a plastic oil and fat composition according to claim 6, wherein the oil and fat B is blended in an amount of 20 to 50 parts by weight.

8. The method for producing a plastic oil and fat composition according to claim 6, wherein the liquid oil is blended in an amount of 20 to 70 parts by weight.

* * * * *